(12) United States Patent
Böckem et al.

(10) Patent No.: US 10,036,811 B2
(45) Date of Patent: Jul. 31, 2018

(54) LASER TRACKER WITH A WARM AIR FLOW SHIELD FOR THE MEASUREMENT BEAM

(71) Applicant: LEICA GEOSYSTEMS AG, Heerbrugg (CH)

(72) Inventors: Burkhard Böckem, Rieden AG (CH); Simon Fuchs, Schöftland (CH); Thomas Lüthi, Aarau (CH); Manfred Küpfer, Waldshut-Tiengen (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 277 days.

(21) Appl. No.: 14/879,633

(22) Filed: Oct. 9, 2015

(65) Prior Publication Data

US 2016/0103222 A1  Apr. 14, 2016

(30) Foreign Application Priority Data

Oct. 10, 2014 (EP) .................. 14188461

(51) Int. Cl.
*G01S 17/66* (2006.01)
*G01C 15/00* (2006.01)
(Continued)

(52) U.S. Cl.
CPC ............ *G01S 17/66* (2013.01); *G01B 5/0014* (2013.01); *G01B 11/002* (2013.01);
(Continued)

(58) Field of Classification Search
CPC ....... G01C 15/002; G01C 3/00; G01S 7/4813; G01S 17/42; G01S 17/89; G01S 826/00; G02B 26/105; G01B 11/24
See application file for complete search history.

(56) References Cited

U.S. PATENT DOCUMENTS

| 5,631,772 A | 5/1997 | Mizukawa |
| 5,973,788 A | 10/1999 | Pettersen et al. |
| (Continued) | | |

FOREIGN PATENT DOCUMENTS

| DE | 10 2010 032 726 B3 | 11/2011 |
| EP | 0 553 266 B1 | 5/1997 |
| (Continued) | | |

OTHER PUBLICATIONS

Partial European Search Report dated Apr. 10, 2015 as received in Application No. 14188461.

*Primary Examiner* — Luke D Ratcliffe
(74) *Attorney, Agent, or Firm* — Maschoff Brennan

(57) ABSTRACT

Some embodiments of the invention relate to a coordinate measuring machine for determining the position and/or for continuous tracking of a target embodied as a retroreflector or at least having a retroreflector. In some embodiments, the coordinate measuring machine may be a laser tracker. The coordinate measuring machine may include comprising at least a base defining a vertical axis, a support swivelable relative thereto and, tiltable thereto a beam guiding unit for emitting measurement radiation for receiving at least some of the measurement radiation reflected at the target. In some embodiments, the coordinate measuring machine includes a heat influence reduction component that may be configured to prevent and/or actively reduce heat emission, and/or obstruct or prevent warm air from passing through the near region free beam path.

17 Claims, 15 Drawing Sheets

(51) Int. Cl.
  *G01B 11/00* (2006.01)
  *G01S 7/481* (2006.01)
  *G01C 3/04* (2006.01)
  *G01S 17/08* (2006.01)
  *G01B 5/00* (2006.01)

(52) U.S. Cl.
  CPC .............. *G01B 11/005* (2013.01); *G01C 3/04* (2013.01); *G01C 15/002* (2013.01); *G01S 7/481* (2013.01); *G01S 7/4813* (2013.01); *G01S 17/08* (2013.01)

(56) References Cited

U.S. PATENT DOCUMENTS

| | | |
|---|---|---|
| 6,259,558 B1 | 7/2001 | Fischer et al. |
| 6,411,371 B1 * | 6/2002 | Hinderling ............ G01S 7/4811 356/4.01 |
| 8,031,331 B2 | 10/2011 | Meier et al. |
| 8,705,012 B2 | 4/2014 | Greiner et al. |
| 9,322,654 B2 | 4/2016 | Böckem |
| 2013/0010307 A1 * | 1/2013 | Greiner ................ G01C 15/002 356/601 |
| 2013/0314693 A1 * | 11/2013 | Skidmore ............... G01S 13/88 356/5.01 |
| 2015/0029489 A1 | 1/2015 | Metzler |
| 2015/0042977 A1 | 2/2015 | Siercks et al. |

FOREIGN PATENT DOCUMENTS

| | | |
|---|---|---|
| EP | 0887680 A1 | 12/1998 |
| EP | 2141450 A1 | 1/2010 |
| EP | 2 620 745 A1 | 7/2013 |
| EP | 2 620 746 A1 | 7/2013 |
| EP | 2801841 A1 | 11/2014 |
| WO | 2007/079600 A1 | 7/2007 |

* cited by examiner

LASER TRACKER WITH A WARM AIR FLOW SHIELD FOR THE MEASUREMENT BEAM

FIELD OF THE INVENTION

The invention relates to a coordinate measuring machine, in particular a laser tracker, for determining the position and, in particular, continuous tracking of a target embodied as a retroreflector or at least having a retroreflector.

BACKGROUND

A multiplicity of methods and instruments for measuring a target point have been known since antiquity. Here, the distance and angle from a measurement instrument to a target point are recorded as a spatial standard data and, in particular, the location of the measurement instrument is acquired, in addition to possibly present reference points.

A laser tracker, a theodolite, a tachymeter and a total station represent known examples for such measuring instruments, wherein the last example is also referred to as electronic tachymeter or computer tachymeter.

Such instruments comprise electrosensory angle and distance measurement functions, which render it possible to determine a direction and a distance to a selected target. Here, the angle or distance variables are established in the internal reference system of the instrument and may still need to be linked to an external reference system for determining an absolute position.

In general, measurement devices embodied for continuous tracking of a target point and for a coordinative position determination of this point can be subsumed under the term laser tracker, in particular in the context of industrial measurement. Here, a target point can be represented by a retroreflecting unit (e.g. triple prism or corner cube reflector), which is sighted using a directed optical measurement beam of the measurement device, in particular using a laser beam. The laser beam is reflected back to the measurement device in parallel, with the reflected beam being acquired by an acquisition unit of the device. Here, an emission or reception direction of the beam is established, for example by means of sensors for measuring angles, which are assigned to the deflection mirror or a targeting unit of the system. Moreover, a distance from the measurement device to the target point is established when acquiring the beam, for example by means of a time-of-flight of a phase difference measurement or by means of the Fizeau principle.

Moreover, an offset of the received measurement beam from a zero position is established generically at a fine targeting or tracking sensor in tracker systems. A difference in position between the center of a retroreflector and the point of incidence of the laser beam on the reflector can be determined by means of this measurable offset and the alignment of the laser beam can be corrected or updated dependent on this deviation in such a way that the offset is reduced on the fine targeting sensor, in particular set to "zero", and therefore the beam is aligned in the direction of the reflector center. By updating the laser beam alignment there can be continuous target tracking of the target point and the distance and position of the target point relative to the measuring instrument can be determined continuously. Here, updating can be realized by means of a change in alignment of the deflection mirror which is movable by motor and provided for deflecting the laser beam, and/or by swiveling the targeting unit which has the beam-guiding laser optics.

Laser trackers according to the prior art may additionally be configured with one or more optical image acquisition units with a two-dimensional, light-sensitive array, e.g. a CCD or CID, or a camera based on a CMOS array, or with a pixel array sensor and with an image processing unit. Such cameras—generally with a broad viewing angle compared to the reception optics for the reflected measurement radiation—can e.g. be attached and provided for providing target search functionalities and/or 6-DOF determination functionalities (the latter in conjunction with the use of an e.g. sensing measurement aid).

By acquiring and evaluating an image—by means of image acquisition unit and image processing unit—from a so-called auxiliary measurement instrument with markings, the relative locations of which with respect to one another are known, it is possible to deduce an orientation in space of an object arranged at the auxiliary measurement instrument. Together with the determined spatial position of the target point (e.g. a retroreflector at the auxiliary measurement instrument sighted by the laser beam), it is ultimately furthermore possible to determine precisely the position and orientation of the object in space in absolute terms and/or relative to the laser tracker. Such a coordinate measuring machine with a laser tracker and an image acquisition unit for determining position and orientation of objects in space, at which light points and reflectors are arranged, is described e.g. in U.S. Pat. No. 5,973,788.

Such auxiliary measurement instruments can be so-called sensing tools which, with the contact point thereof, are positioned on a point of the target object. The sensing tool has markings, e.g. light points, and a reflector, which represents a target point at the sensing tool and which can be sighted by the laser beam of the tracker, wherein the positions of the markings and of the reflector are known precisely relative to the contact point of the sensing tool. In a manner known to a person skilled in the art, the auxiliary measurement instrument can also be an e.g. hand-held scanner, which is equipped for point measurements, for a contactless surface measurement, wherein direction and position of the scanner measurement beam used for the distance measurement are accurately known relative to the light points and reflectors arranged on the scanner. By way of example, such a scanner is described in EP 0 553 266.

For measuring the distance, laser trackers according to the prior art have at least one rangefinder, wherein the latter can be embodied e.g. as an interferometer and/or as an absolute rangefinder (e.g. based on time-of-flight or phase difference measurements or the Fizeau principle).

WO 2007/079600 A1 discloses a generic laser-based coordinate measuring machine, in which light emergence and light reception optics of the distance measuring device, a measurement camera and an overview camera are arranged on a common element rotatable in relation to at least two axes and in which a laser beam from a laser module attached outside of the beam guiding unit is coupled into the distance measurement device by means of an optical waveguide.

Within the scope of ongoing development of technologically highly developed measurement systems, which have a very high accuracy potential, strategies for correcting atmospherically induced disturbances become ever more important. These atmospherically induced disturbances are produced over a large timescale range: systematic deviations, which are referred to as "refraction" in the geodetic context and which are caused by a refractive index gradient in the observation surroundings, eventually merge into stochastic deviations, which are caused by optical turbulence or which are equivalent to the effect of optical turbulence, at least in terms of the consequence thereof.

Refraction-corrected optical direction and angle measurements, but also refraction-corrected optical distance measurements, are required within the scope of numerous task areas in the field of highly precise measurement. By way of example, these task areas contain measurement applications not only within the scope of industrial measurement (e.g. in industrial quality-control or assembly processes, e.g. in the aeronautical or automotive industry) but also in the field of geodetic measurement, in the field of structural and civil engineering projects, in the context of alignment problems, e.g. in the case of particle accelerators, or for the spatial control of large moving machines.

SUMMARY

Some embodiments of the invention provide an improved coordinate measuring machine, in particular a laser tracker, in which the exhaust heat influence caused by the instrument has at least a smaller effect, or where possible no effect, on the measurement results which are based on the emission and reception of the directed measurement radiation.

This object is achieved by the implementation of the characterizing features of the independent claims. Features which developed the invention in an alternative or advantageous manner can be gathered from the dependent patent claims.

Subject matter of the invention is a coordinate measuring machine, in particular a laser tracker, for determining the position and, in particular, continuous tracking of a target embodied as a retroreflector or at least having a retroreflector. The coordinate measuring machine comprises at least a base defining a vertical axis, a beam guiding unit for emitting measurement radiation from a measurement radiation emergence aperture and for receiving at least some of the measurement radiation reflected at the target. The beam guiding unit is swivelable (more particularly swivelable in a motor-driven manner) about the vertical axis and an inclination axis relative to the base. A measurement axis is defined by an emission direction of the measurement radiation. Moreover, the coordinate measuring machine comprises a distance measurement unit for precisely measuring the distance to the target by means of the measurement radiation, an angle measurement functionality for determining an alignment of the beam guiding unit relative to the base and a target acquisition unit for determining an impact point of radiation reflected by the retroreflector on a sensor of the target acquisition unit and for producing an output signal for controlling a fine targeting functionality and, in particular, a target tracking functionality.

According to the invention, the coordinate measuring machine comprises a heat influence reduction component, which is embodied and arranged on the coordinate measuring machine for active prevention or reduction of heat emission caused by heating of internal components of the coordinate measuring machine and by means of which the emitted measurement radiation can be influenced in a near region beam path of the measurement radiation emergence aperture of the coordinate measuring machine and/or for obstructing or preventing warm air generated by such heat emission from rising into a near region of a free beam path in the near region beam path of the measurement radiation emergence aperture of the coordinate measuring machine.

Here, a region at a distance of up to 20 cm, in particular of up to 10 cm, specifically of up to 5 or 3 cm from the measurement radiation emergence aperture should be understood to be characterizing for the "near region beam path".

In particular, the coordinate measuring machine according to the invention has a support which is swivelable in a motor-driven manner about the vertical axis relative to the base and defines the inclination axis, and the beam guiding unit is embodied as a targeting unit with a telescope unit, which is swivelable in a motor-driven manner about the inclination axis relative to the support and embodied to emit the measurement radiation and receive at least some of the measurement radiation reflected at the target.

In accordance with one embodiment, the heat influence reduction component surrounds at least part of the near region free beam path of the measurement radiation emergence aperture and/or it is embodied adjacent thereto.

In particular, the heat influence reduction component comprises a heat-shielding material with low thermal conductivity, in particular a glass or a polymer, specifically a transparent glass or a transparent polymer for the passage of measurement radiation.

In accordance with a further embodiment, the heat influence reduction component is embodied as a full shield or as a partial shield, which at least in part covers heat emitting regions of the targeting unit, in particular comprising an insulation layer situated between the full shield or partial shield and the targeting unit, which insulation layer can also be embodied as an air cushion, in particular wherein optically transparent openings for the measurement radiation emergence aperture, camera optics and/or illumination means are provided.

In accordance with a further embodiment, the heat influence reduction component has a lateral side of a cylinder-shaped or a lateral side of a frustum-shaped embodiment and surrounds the near region beam path at the measurement radiation emergence aperture.

In accordance with a further embodiment, the heat influence reduction component is embodied as an air emergence nozzle, which has a ring-shaped embodiment and surrounds the measurement radiation emergence aperture, for producing an air cushion, which surrounds the near region beam path and has a lateral side of a frustum-shaped embodiment.

In accordance with a further embodiment, the heat influence reduction component comprises a cover made of heat-insulating material, in particular a polymer, at a base and/or active cooling of heat-emitting regions, particularly in the region of the targeting unit, of the coordinate measuring machine.

In accordance with a further embodiment, the heat influence reduction component has a fan or ventilator, arranged at the base or the support of the coordinate measuring machine, for suctioning away heated air, which air was heated particularly in the region of the base, and preventing the rise thereof in a region of the near region beam path by blowing away the suctioned in air in a transversely directed air flow or for blowing in non-heated external air in a region below the near region beam path of the measurement radiation emergence aperture for preventing the rising thereof into a region of the near region beam path.

BRIEF DESCRIPTION OF THE DRAWINGS

The method according to the invention and the device according to the invention will be described in more detail below in a purely exemplary manner on the basis of specific exemplary embodiments which are schematically depicted in the drawings, with further advantages of the invention also being discussed here. In detail:

FIG. 3: shows an example of a front view of the embodiment of the laser tracker from FIG. 2a;

DETAILED DESCRIPTION

Figure 1:
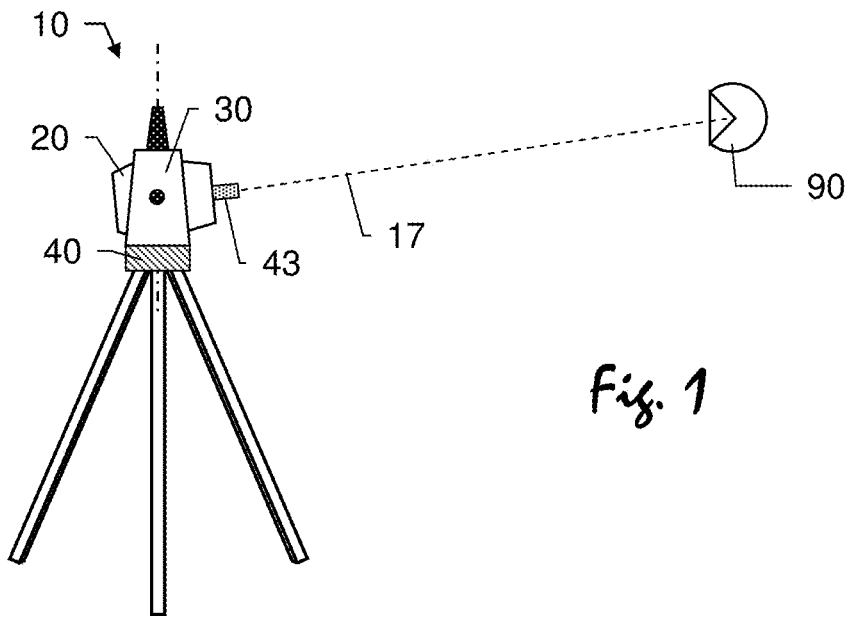
FIG. 1: shows an embodiment according to the invention for a laser tracker and a target.

FIG. 1 shows a first embodiment of a laser tracker 10 and a target embodied as a measurement sphere (with an integrated retroreflector 90). The laser tracker 10 comprises a base 40 and a support 30, with the support 30 being arranged in a manner swivelable or rotatable relative to the base about a swivel axis or vertical axis that is defined through the base 40. Moreover, a targeting unit 20 is arranged on the support 30 in such a way that the targeting unit 20 is swivelable relative to the support 30 about the inclination axis (transit axis) (not depicted here). As a result of the possibility of aligning the targeting unit 20 about two axes provided thus, a laser beam 17 emitted by this unit 20 can be flexibly aligned and hence targets can be sighted. Here, the swivel axis and the inclination axis are arranged substantially orthogonal to one another, i.e. small deviations from exact axis orthogonality can be predetermined and stored in the system, for example for compensating measurement errors produced thereby.

In the shown arrangement, the laser beam 17 is directed to the reflector 90 of the reflector sphere and retro-reflected back to the laser tracker 10 at said reflector. It is possible to determine a distance to the reflector, e.g. by interferometry and/or by means of a time-of-flight or phase measurement, by using this returning measurement laser beam. To this end, the laser tracker 10 comprises one or more distance measuring units for determining this distance between the tracker 10 and reflector and angle measuring units, which determine a rotational position of the targeting unit 20 or of the support 30. Therefore, as a measurement result, two solid angles and the distance are recorded or provided as spatial coordinates of the measurement sphere serving as a target.

Figure 7A:
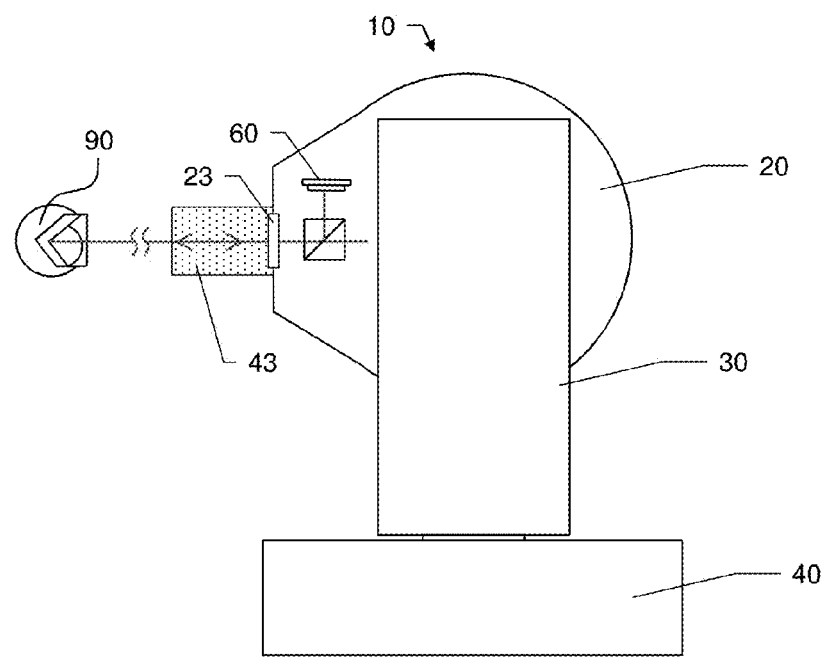
FIGS. 7a, 7b, and 7c show, in an illustration largely analogous to FIG. 5, the region of the targeting unit of a further embodiment of a laser tracker according to the invention with a second embodiment of a heat influence reduction component according to the invention.

For fine targeting and tracking of the target, a position of the reflected measurement beam on the sensor (or an offset of the incident radiation in relation to the zero point position) is determined on a position sensor assigned to the beam path of the measurement radiation (in relation to sensors of this type, see also e.g. reference sign 60 in FIG. 7a). By means of this offset, which is determinable in two directions on the sensor, it is possible to detect a positional change of the reflector and the laser beam can be updated in accordance with this change, and therefore the reflector can be targeted continuously (in the reflector center to be precise).

According to the invention, the laser tracker shown in FIG. 1 has a pipe-shaped body 43 in the region of the measurement radiation emergence aperture, as is once again depicted in detail in the subsequent figures and as will still be described below.

Figure 2A:
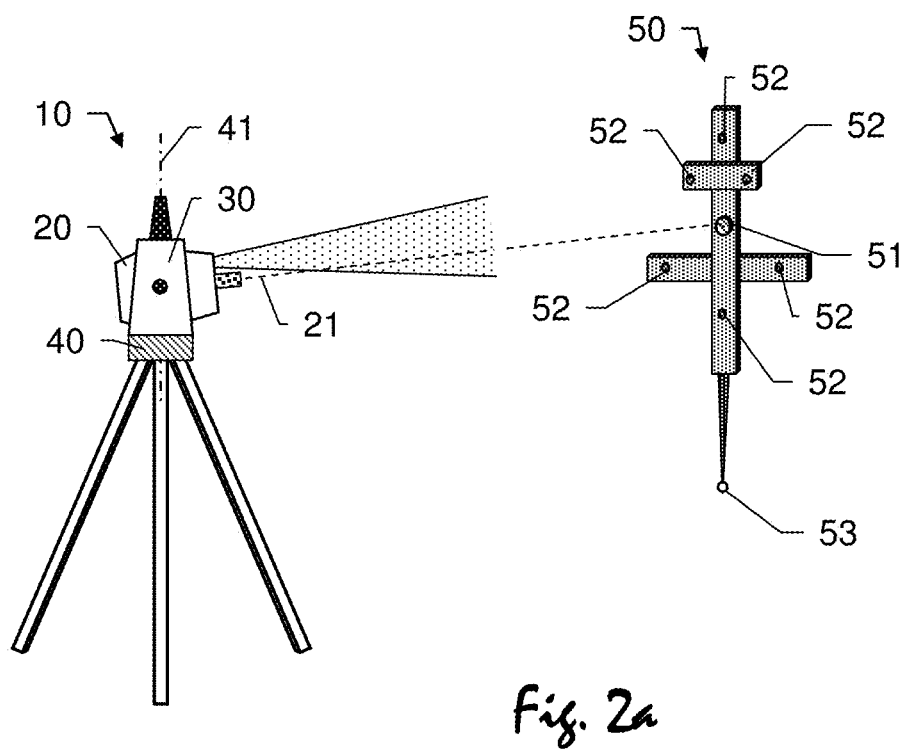
FIG. 2a+b: shows two further embodiments according to the invention for laser trackers and targets.
Figure 2B:
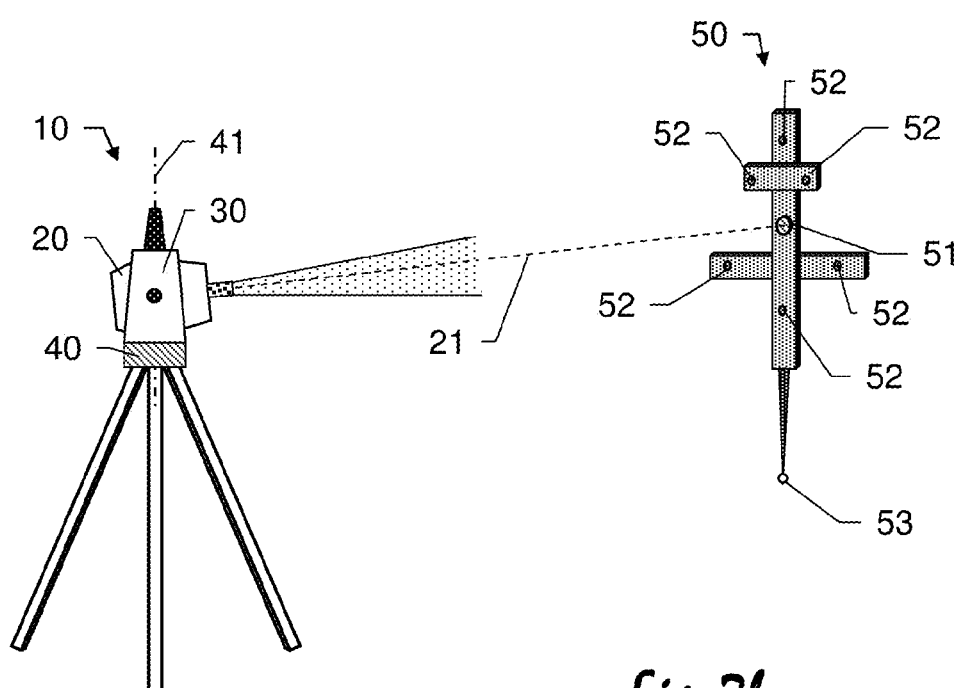

Here, FIGS. 2a and 2b depict further variants of laser trackers in use with respectively one auxiliary measurement object 50, the position and orientation of which is intended to be determined with 6-DOF (i.e. with six degrees of freedom: three translational and three rotational).

The laser tracker 10 from FIG. 2a has a base 40 and a support 30, with the support 30 being arranged in a swivelable or rotatable manner relative to the base 40 about a swivel axis 41 defined by the base 40. Moreover, a targeting unit 20 (swivel unit) is arranged on the support 30 in such a way that the targeting unit 20 is rotatable relative to the support 30 about a tilt axis (inclination or transit axis). As a result of the possibility of aligning the targeting unit 20 about two axes provided thus, a laser beam 21 emitted by this unit 20 can be aligned exactly and hence retroreflectors can be targeted. This alignment can be implemented automatically by means of a motorized drive. Here, the swivel axis 41 and the inclination axis are arranged substantially orthogonal to one another, i.e. small deviations from exact axis orthogonality can be predetermined and stored in the system, for example for compensating measurement errors produced thereby.

In the shown arrangement, the measurement laser beam 21 is directed onto the retroreflector 51 of the auxiliary measurement object 50 and retro-reflected back to the laser tracker 10 at said retroreflector. A distance to the object 50 or to the reflector 51 can be determined by using this measurement laser beam 21, in particular by means of a time-of-flight measurement, by means of the phase measurement principle or by means of the Fizeau principle. To this end, the laser tracker 10 comprises a distance measuring unit (e.g. with interferometer and absolute distance measuring unit, or only an absolute distance measuring unit) and angle measuring units, which make a position of the targeting unit 20, by means of which the laser beam 21 can be aligned and guided in a defined manner, and hence a propagation direction of the laser beam 21 determinable.

Moreover, the laser tracker 10, in particular the swivel unit 20, comprises an image acquisition unit. For the purpose of determining the position of the sensor exposure on a sensor or in an acquired image, this image acquisition unit can comprise a CMOS or, in particular, be embodied as a CCD or pixel sensor array camera. Such sensors enable a position-sensitive detection of acquired exposure on the detector. The auxiliary measurement object 50 has a tactile sensor 53, the ruby sphere of which can be brought into contact with a target object surface to be measured. While this contact is established between the sensing tool 50 and the measurement object surface, it is possible to determine exactly a position of the contact point 53 in space and therefore the coordinates of the sensed point at the measurement object surface. This determination is implemented by means of defined relative positioning of the contact point 53 in relation to the reflector 51 and in relation to reference features 52 arranged at the auxiliary measurement object 50, which reference features may e.g. be embodied as light-emitting diodes (LEDs). Alternatively, the reference features 52 can also be embodied in such a way (e.g. markings 52 with a reflective embodiment) that these reflect the incident radiation in the case of illumination, e.g. using radiation with a defined wavelength, in particular exhibit a specific illumination characteristic, or in such a way that these have a defined pattern or color encoding. Therefore, an orientation of the sensing tool 50 can be determined from the position or distribution of the light points generated by the reference features 52 in an image acquired by a sensor of the image acquisition unit.

Therefore, the acquired image of the auxiliary measurement object 50 or of the provided light points of the object 50 serves as a basis for determining the orientation. For a particularly focused acquisition of the LEDs 52 using an ideal and known image scale, the laser tracker 10 may comprise variable zoom optics, i.e. two optical assemblies (e.g. lenses), which are positionable independently of one another and relative to the image acquisition sensor.

For this ultimate determination of the orientation, the laser tracker 10 furthermore comprises a specific image recording and evaluation functionality, which is implementable by a control and processing unit of the tracker 10. Within the scope of this embodiment, an image of the reference features 52 of the auxiliary measurement instrument 50 is acquired and the orientation or alignment of the auxiliary measurement object 50 is derived on the basis of the image positions for the light points acquired in the image. Here, the camera is aligned in such a way that image is acquirable in the direction of the auxiliary measurement means 50 targeted by means of the laser beam 21.

Here, the laser tracker 10 from FIG. 2b can substantially have a similar embodiment to that of FIG. 2a. A difference lies in the fact that the camera for recording the image of the pattern formed by the markings 52, integrated into the targeting unit 20, is arranged and aligned coaxially in relation to the laser and a measurement axis. An example of such an embodiment of the laser tracker is described e.g. in the European patent application with the number EP 13167256.0.

According to the invention, the laser trackers from FIGS. 2a and 2b also each comprise a pipe-shaped body 43 in the region of the measurement radiation emergence aperture, as is once again depicted in detail in the subsequent figures and as will still be described below.

Figure 3:
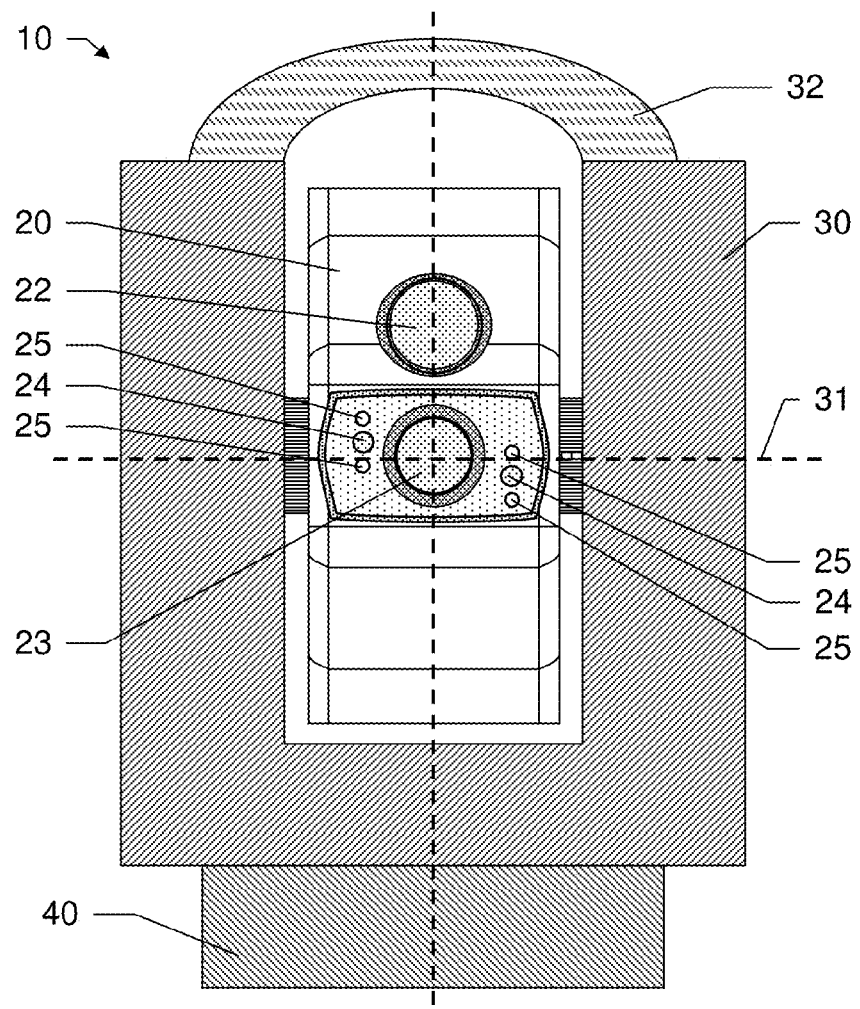

FIG. 3 shows an example for a frontal view of the embodiment of the laser tracker from FIG. 2a, comprising a base 40, which may, for example, be arranged on a stand (not depicted here). Moreover, a support 30, which defines an inclination axis 31, which is swivelable about the swivel axis relative to the base 40 and which comprises a handle 32, is arranged on the base. Moreover, provision is made of a targeting unit 20, wherein this targeting unit 20 is installed in a manner swivelable about the inclination axis 31 relative to the support 30.

By way of example, the targeting unit 20 furthermore comprises a variable-focus camera with a variable-focus camera lens 22 and optics or a measurement radiation emergence aperture 23, which is assigned to the distance measuring and tracking unit arranged in the targeting unit 20, wherein, by means of the optics 23, a measurement laser beam is emitted by the distance measuring and tracking unit for the purposes of precisely determining the distance to the target and for the purposes of tracking the target. Moreover, two cameras 24, each with camera optics and each with a position-sensitive detector, and moreover illumination means 25, which e.g. are embodied as LEDs and emit light during operation, particularly in the infrared range, are provided, for example at the targeting unit 20. Therefore, by using these illumination means 25, it is possible to illuminate or direct radiation to a target, e.g. a reflector, and it is possible for at least some of the radiation to be reflected back by the reflector in the direction of the laser tracker 12 or in the direction of the cameras 24. The reflected light is then acquired by means of the cameras 24 and imaged in the respective first and second target reflection spot on the respective position-sensitive detector by means of the camera optics. From this, a direction angle to the reflector serving as a target can be determined for each of these target reflection spots, taking into account the alignment of the telescope or the targeting unit 20. Automated finding of the target can be implemented by means of this spatial direction of the target acquired thus. In particular, the target can thus be found in this case by means of stereophotogrammetry (by evaluating the image positions of both target reflection spots).

Once the laser beam is aligned on the reflector and reflected back by the latter, it is possible to determine the precise distance to the reflector 81 by means of a distance measuring unit in the laser tracker 12 or in the targeting unit 20. Furthermore, the laser beam can be coupled to the reflector (retroreflector) and the reflector can be tracked by the beam. To this end, the position of the reflected measurement beam on the sensor and an offset of the incident radiation in relation to the zero point position (see also e.g. reference sign 60 in FIG. 7a) are determined on a further position sensor assigned to the beam path of the measurement radiation. By means of this offset, which is determinable in two directions on the sensor, it is possible to detect a change in position of the reflector and the laser beam can be updated in accordance with this change and therefore the reflector can be targeted continuously.

Figure 4:
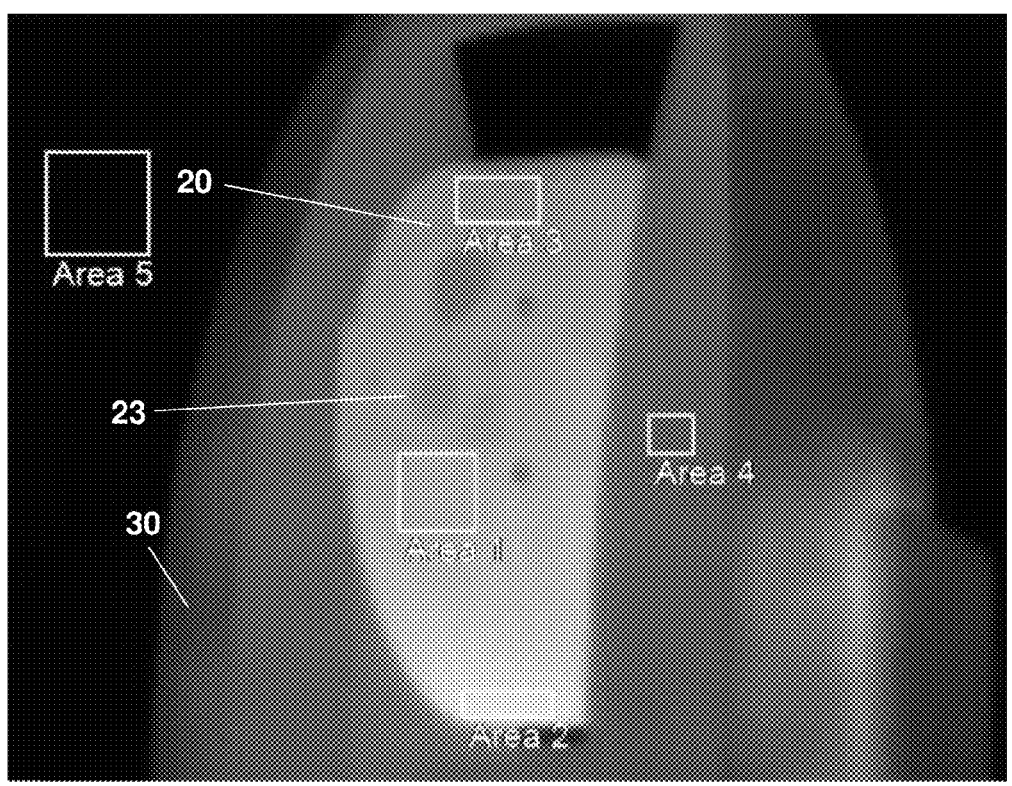
FIG. 4: shows an infrared recording or thermal image of the range of the surface temperatures of a targeting unit of a laser tracker according to the prior art in a sectional magnification.

FIG. 4 shows, in a sectional magnification, an infrared recording or thermal image of the range of the surface temperatures of the targeting unit 20 of a laser tracker which—except for the pipe-shaped body according to the invention for reducing turbulence effects in the free beam path near region of the measurement beam—corresponds to the design of the laser tracker from FIGS. 2a and 3.

Here, the thermal image recording was produced after a warm-up phase during standard operation of the device. Regions of the housing with a comparatively high temperature have a comparatively bright depiction in the thermal image and regions of the housing with a comparatively lower temperature have a comparatively dark depiction in the thermal image.

The region "Area 1" below the measurement radiation emergence aperture 23 (which simultaneously serves as recording lens) of the targeting unit 20 is largely relevant for the heating of air, which then flows through a free beam path in the near region of the measurement radiation emergence aperture 23. Temperature gradients in particular, which exist into the region of the near region free beam path, substantially are the cause of the refractive index fluctuations, which are responsible to a high degree for inaccuracies or errors when determining the angle and distance. For the purposes of optimizing the arrangement, further selected regions ("Area 2", "Area 3", "Area 4" and "Area 5") of the registered infrared image are evident and taking particularly into account during an optimization within the scope of the overall evaluation, even if this is not illustrated in any more detail here.

Figure 5:
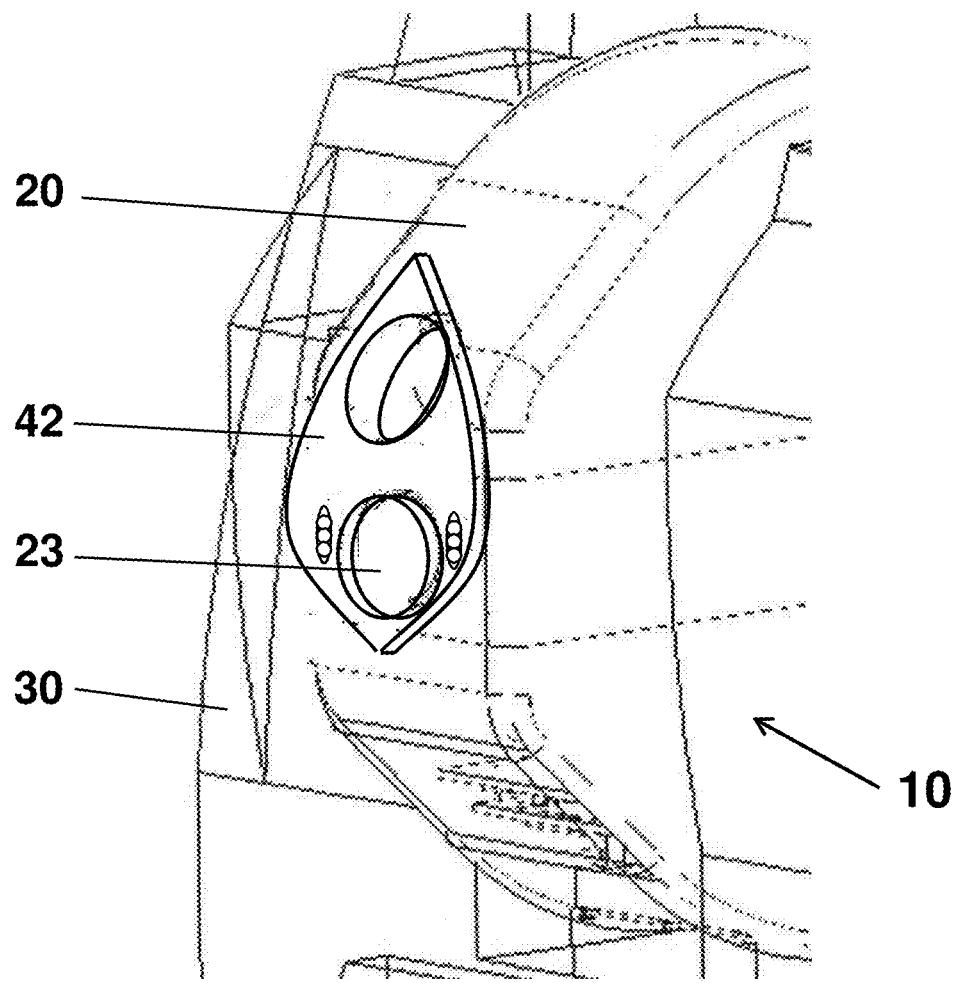
FIG. 5: shows the region of the targeting unit of a laser tracker according to the invention as an example of a coordinate measuring machine according to the invention with a first embodiment of a heat influence reduction component according to the invention.

FIG. 5 shows a region of the targeting unit 20 of the laser tracker according to the invention as an example of a coordinate measuring machine according to the invention with a further embodiment 42 of a heat influence reduction component according to the invention. Here, this is a thermally insulating shield 42, for example made of polymers. The shield 42 is attached to the front side of the housing of the targeting unit 20 and largely covers heat exposed parts thereof, while having cutouts for the variable camera lens 22, the measurement radiation emergence aperture 23 and cameras 24 and illumination means 25, in accordance with the embodiment of a laser tracker in accordance with FIGS. 2a and 3. For the purposes of additionally obstructing a thermal transmission, this partial envelope embodied as a shield 42 has an air gap from the metal housing of the targeting unit/telescope, which is heated due to the operation. By contrast, a tight determination is provided on the circumference pointing to the outside (i.e. in the direction of the reception light beam).

Figure 6:
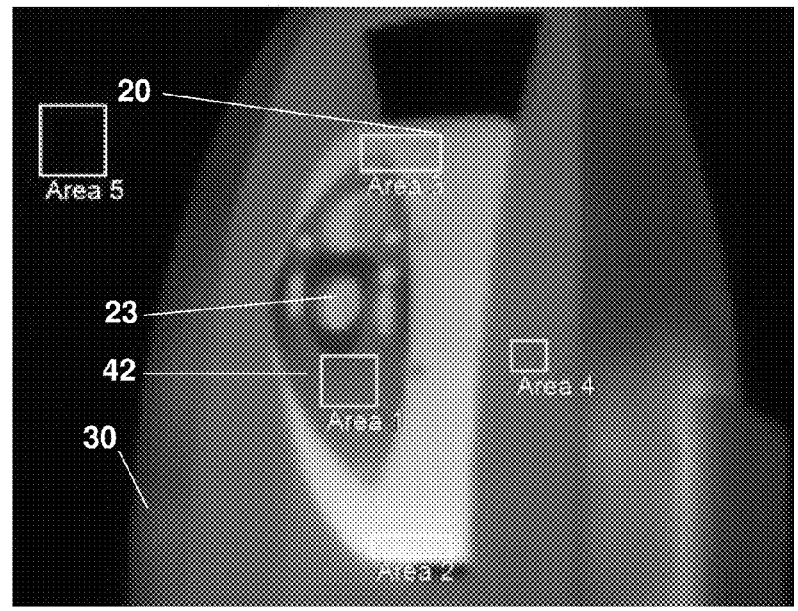
FIG. 6: shows an illustration for the depiction region of FIG. 5, in a thermal image analogous to FIG. 4, the effect of a thermally insulating shield in accordance with the embodiment of a heat influence reduction component according to the invention according to FIG. 5.

In a thermal image analogous to FIG. 4, FIG. 6 depicts the effect of the heat-insulating shield 42 in accordance with the embodiment of FIG. 5 for the depiction region of FIG. 5. It can clearly be seen that the regions directly in front of the shield 42 are significantly cooler compared to the temperature diagram of FIG. 4 (as these are clearly depicted to be darker in the thermal image).

Figure 7B:
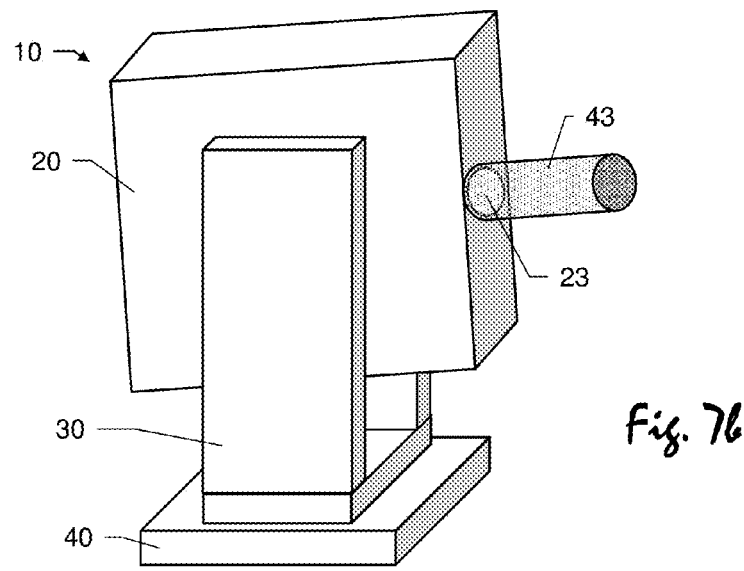
Figure 7C:
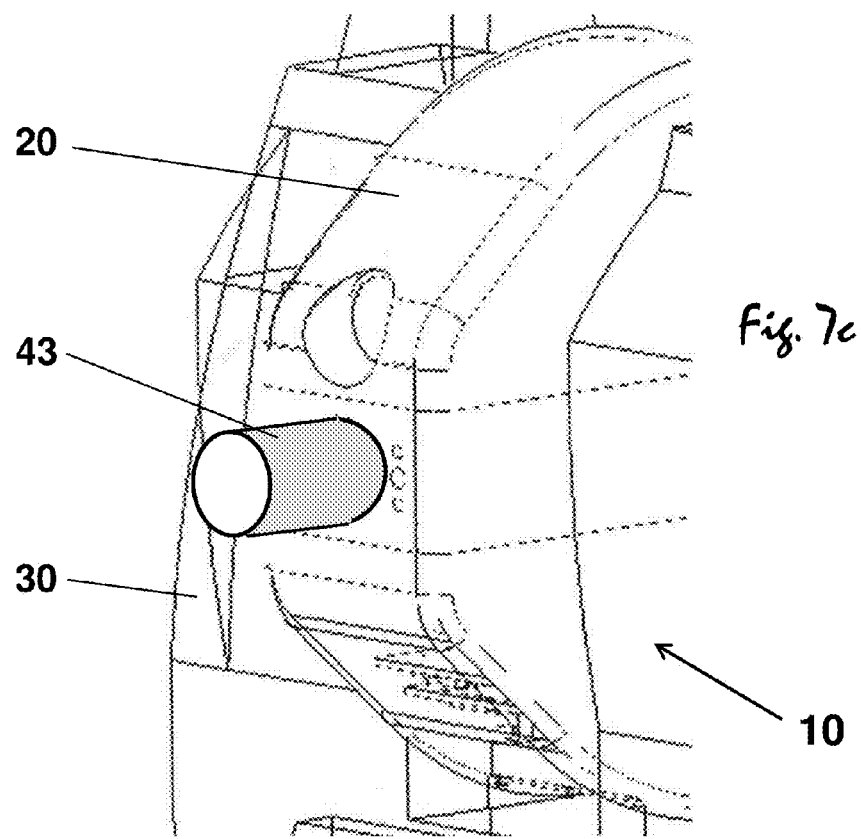

FIGS. 7a to 7c depict various views of the laser trackers which have a similar design to the examples shown in FIGS. 1 and 2a. Here, FIGS. 7a and 7b show views of laser trackers which can have approximately the same design as a laser tracker shown in FIG. 1 and FIG. 7c shows a view of a laser tracker in accordance with FIGS. 2a and 3, with the view being largely analogous to the illustration from FIG. 5.

FIGS. 7a to 7c show examples in which the heat influence reduction component is in each case embodied as a pipe-shaped body. Here, this is a thermally insulating pipe-shaped shield 43, which in turn is made of a material which has the best possible thermal conductivity, e.g. polymers.

The pipe shield 43 surrounds the near region beam path of the targeting unit (20) with the measurement radiation emergence aperture 23. Therefore, air influenced by waste heat, in particular from the laser tracker, is now forced to flow around the near region free beam path of the measurement radiation (i.e. the free beam path of the measurement radiation in the near zone of the instrument) such that the air flows now have a smaller, or no, influence on the optical properties of the measurement radiation in the near region of the instrument.

The turbulence effects otherwise produced by the rising warm air (which, without the pipe shield 43, would flow through the free beam path within a near zone of the instrument), which influence the direction of the measurement beam (cf. heat shimmer), can be significantly reduced in an effective manner on the basis of such a pipe shield 43. A substantial portion of the negative effect of such turbulence effects can already be avoided if the pipe shield 43 has a dimension of e.g. at least approximately 2 cm in length.

Here, the pipe-shaped shield is embodied with a round cross section in a purely exemplary manner. However, the shield can also have an oval or elliptical cross section, or, in particular, also a polygonal (e.g. quadratic, pentagonal or hexagonal, etc.) cross section.

Thus, in conclusion, the heat influence reduction component according to the invention can in particular be embodied as a pipe-shaped body with a substantially airtight pipe wall and be arranged in such a way that the body surrounds at least part of the near region free beam path (such that, thus, air flows are thereby prevented from passing through the part of the near region beam path covered by the body and, hence, turbulences caused e.g. by rising warm air are reduced in the near region free beam path).

The pipe-shaped body can—as depicted in the figures as an example—have a hollow or internal cross-sectional dimension (internal diameter) which corresponds to a dimension (or diameter) of the measurement radiation emergence aperture 23. That is to say, the internal cross-sectional dimension of the pipe-shaped body e.g. only slightly/insubstantially (minimally) exceeds the dimension of the measurement radiation emergence aperture 23. Furthermore, the pipe-shaped body can also have a cross section (in terms of the form, i.e. a cross-sectional form) which corresponds to the form of the measurement radiation emergence aperture 23. In particular, both the measurement radiation emergence aperture 23 and the cross-sectional form of the body have a circular round shape. However, it is also possible to select an oval, elliptic or polygonal (quadrilateral, pentagonal, hexagonal, etc.) form.

As can likewise be gathered from the figures, the pipe-shaped body is, with the ends thereof, arranged directly at (fastened directly to) part of the housing surrounding the measurement radiation emergence aperture 23.

The pipe-shaped body can have a length of at least 2 cm, in particular at least 3 cm. Experimental trials have shown that a significant increase in accuracy (in relation to the angle and distance measurement) is obtainable in this case, precisely from the length of at least 2 cm. Although this increase in accuracy can once again be significantly increased in the case of a length of 5 cm or even 10 cm, this may often also require additional outlay due to the construction thereof (or detours in the construction, which are reluctantly accepted).

Here, an inner wall surface of the pipe-shaped body can be embodied to reflect as little as possible (i.e. embodied in a non-reflecting manner). By way of example, the inner wall surface can be embodied as a dark, slightly rough (i.e. unpolished/unsmoothed) plastic surface such that no interfering reflections are generated at the inner surface of the pipe (inner side).

Figure 8:
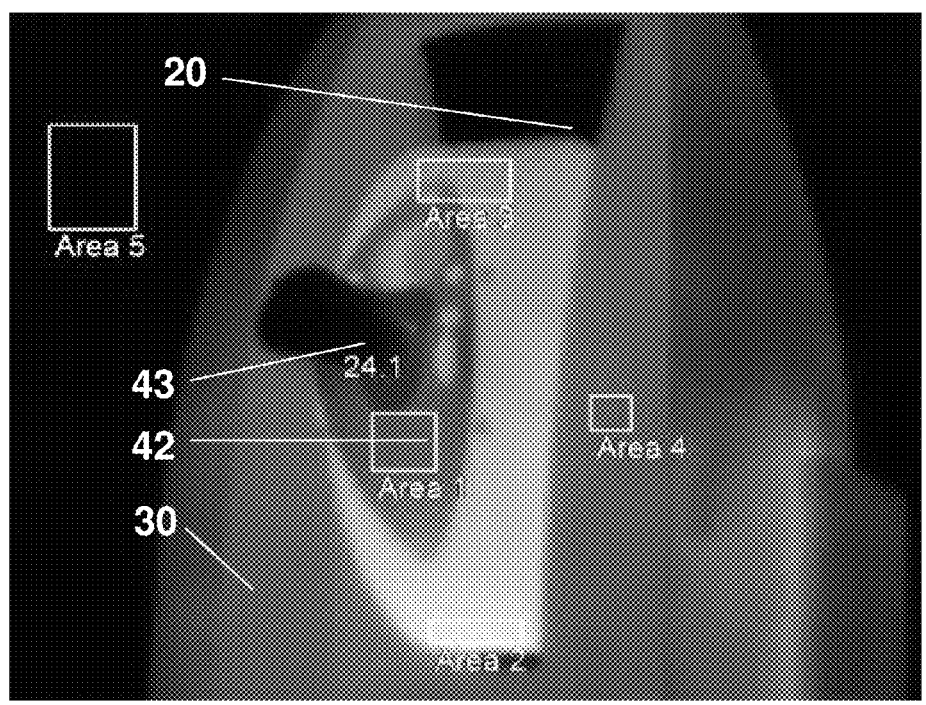
FIG. 8: shows an illustration for the depiction region of FIG. 7, in a thermal image analogous to FIG. 4, the common effect of the thermally insulating pipe shield in accordance with the embodiment of the heat influence reduction component according to the invention of FIG. 7 and the thermally insulating shield in accordance with FIG. 5 and FIG. 6.

For the depiction region of FIG. 7, FIG. 8 illustrates, in a thermal image analogous to FIG. 4, the common effect of the thermally insulating pipe shield 43 in accordance with the embodiment of the thermal influence reduction component of FIG. 7 and of the thermally insulating shield in accordance with FIG. 5 and FIG. 6. Naturally, the regions directly in front of the shield 42 are cooler compared to the temperature diagram of FIG. 4.

There is a significantly stronger reduction in temperature, namely to a value near the temperature of the instrument surroundings, in the region of the near region free beam path surrounded by the pipe shield 43.

Figure 9:
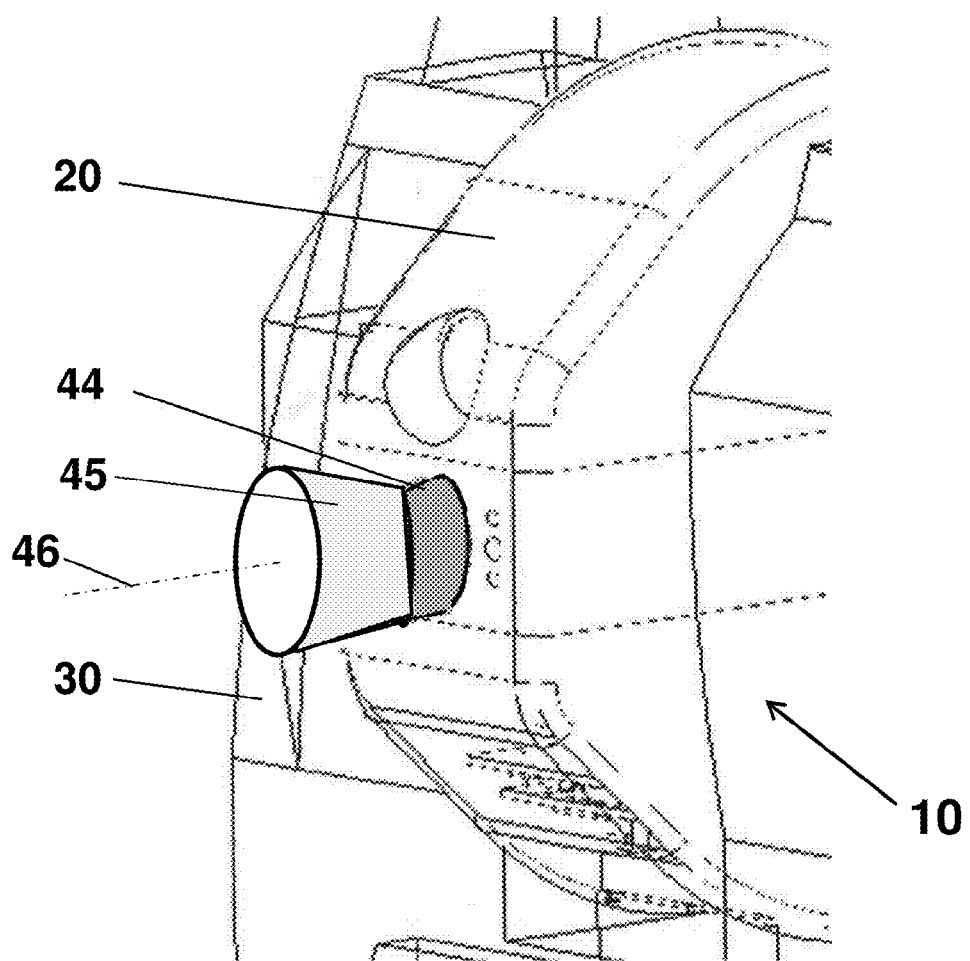
FIG. 9: shows the region of the targeting unit of a further embodiment of a laser tracker according to the invention with a third embodiment of a heat influence reduction component according to the invention.

FIG. 9 shows a region of the targeting unit 20 of a further embodiment of a laser tracker according to the invention, with a third embodiment 44, 45 of the heat influence reduction component according to the invention. This is a ring nozzle 44 which surrounds the measurement radiation emergence aperture 23 (not visible here), by means of which ring nozzle an air flow surrounding the near region beam path, which is denoted here by the optical axis 46 thereof, in a cone or frustum-shaped manner is produced as an air flow cushion 45. This airflow 45 prevents exhaust heat air flow from passing through the near region beam path.

FIGS. 10 to 13 show, only in the form of thermal images, the effect of further embodiments of heat influence reduction components according to the invention on the temperature distribution in the region of the targeting unit 20 of appropriately equipped embodiments of the laser trackers according to the invention.

Figure 10:
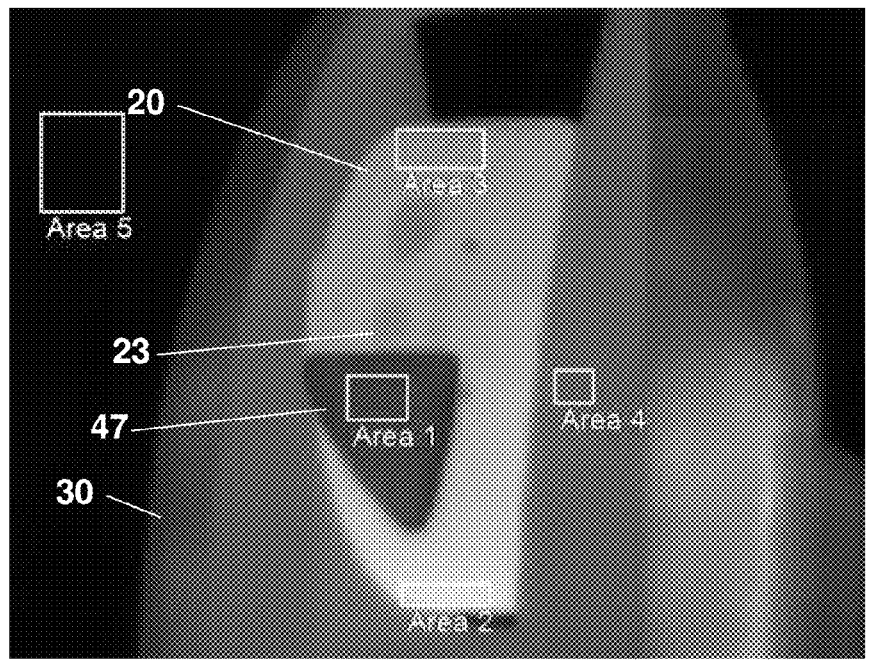
FIG. 10: shows a thermal image of an illustration of the effect of an embodiment with a triangular shape of a heat influence reduction component according to the invention, which is arranged just below the reception optics of the laser tracker according to the invention.

FIG. 10 shows the effect of a triangular embodiment 47, made of polyethylene foam ("PE foam"), of a heat influence reduction component according to the invention, which is arranged just below the measurement radiation emergence aperture 23.

Figure 11:
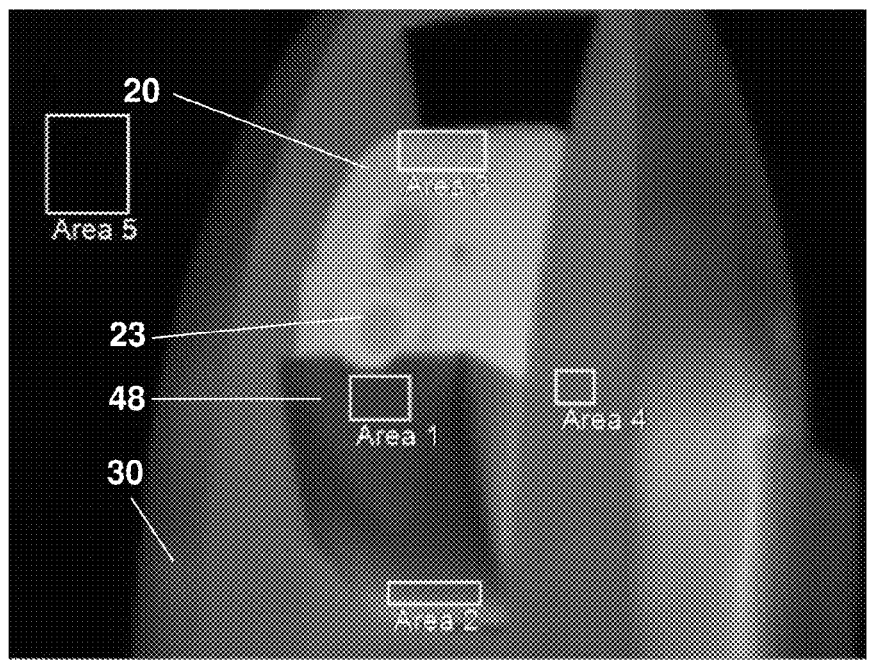
FIG. 11: shows a thermal image of an illustration of the effect of a shield completely covering the lower half of the targeting unit, of a heat influence reduction component according to the invention, which partly surrounds the reception optics of the laser tracker in a lower region.

FIG. 11 shows the effect of an embodiment 48 as shield 48, completely covering the lower half of the targeting unit 20 and made of polyethylene foam, of a heat influence reduction component according to the invention, which partly surrounds the measurement radiation emergence aperture 23 in the lower region thereof.

Figure 12:
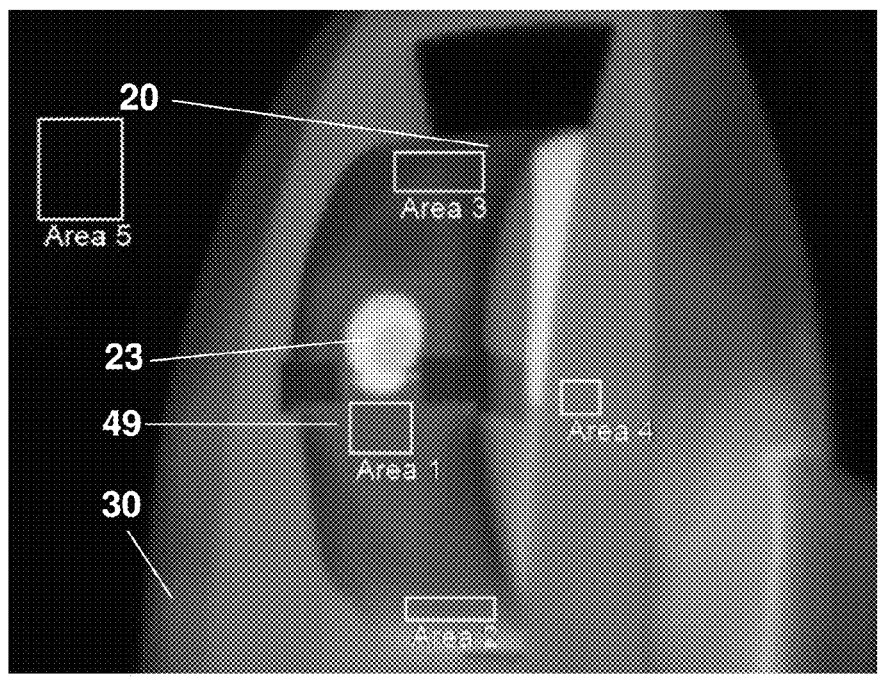
FIG. 12: shows a thermal image of an illustration of the combined effect with, in addition to the embodiment in accordance with FIG. 11, a shield also completely covering the upper half of the targeting unit, i.e. a full shield as a heat influence reduction component according to the invention, which completely surrounds the reception optics of the laser tracker.

FIG. 12 shows a combined effect with a shield also covering, in addition to the embodiment in accordance with FIG. 11, the upper half of the targeting unit 20 completely, i.e. an embodiment 49, embodied as complete as shield 49 made of polyethylene foam, of the heat influence reduction component according to the invention, which completely surrounds the measurement radiation emergence aperture 23.

Figure 13:
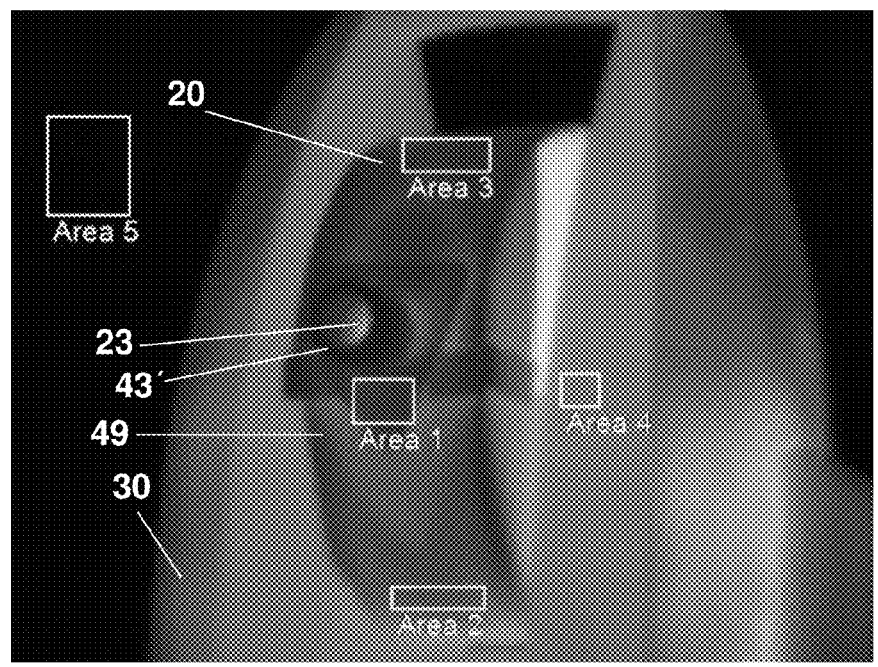
FIG. 13: shows a thermal image of an illustration of the effect with a combination of the full shield in accordance with FIG. 12 and a development of the pipe-shaped to shield in accordance with FIG. 8.

FIG. 13 illustrates the effect of a combination of the full shield 49 in accordance with FIG. 12 and a further embodiment 43' of the pipe-shaped shield. The pipe-shaped shield component 43' used here is manufactured from polyoxymethylene (POM) and has a length of 40 mm. Using this embodiment here, where the pipe is selected to be slightly shorter than in the embodiment shown in the thermal image recording of FIG. 8, it is already possible to read off a significant lowering of the temperature in the thermal image in the region of the near region free beam path (although not quite as much as in the case of the long pipe in accordance with FIG. 8).

Figure 14:
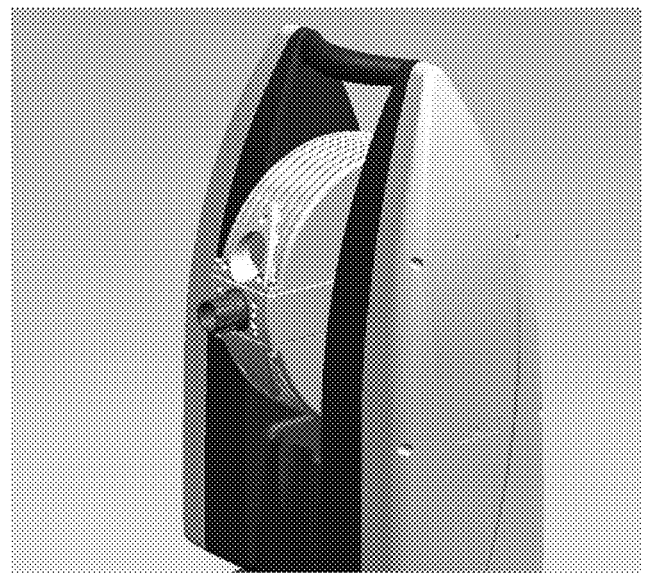
FIG. 14: shows an embodiment of a heat influence reduction component according to the invention which has a substantially different embodiment to the preceding examples in respect of the functional principle—for a coordinate measuring machine, more particularly a laser tracker, according to the invention.
Figure 14:
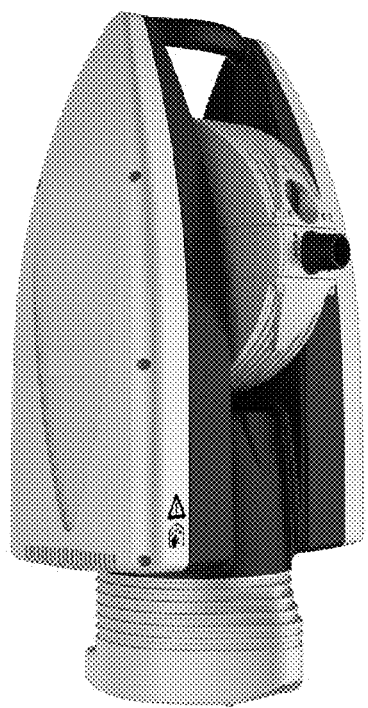

FIG. 14 shows two further illustrations of an example of a laser tracker with a pipe-shaped cover according to the invention. Here, in terms of the principle thereof, this embodiment once again corresponds to that shown schematically in FIGS. 2a, 3 and 7c.

Figure 15:
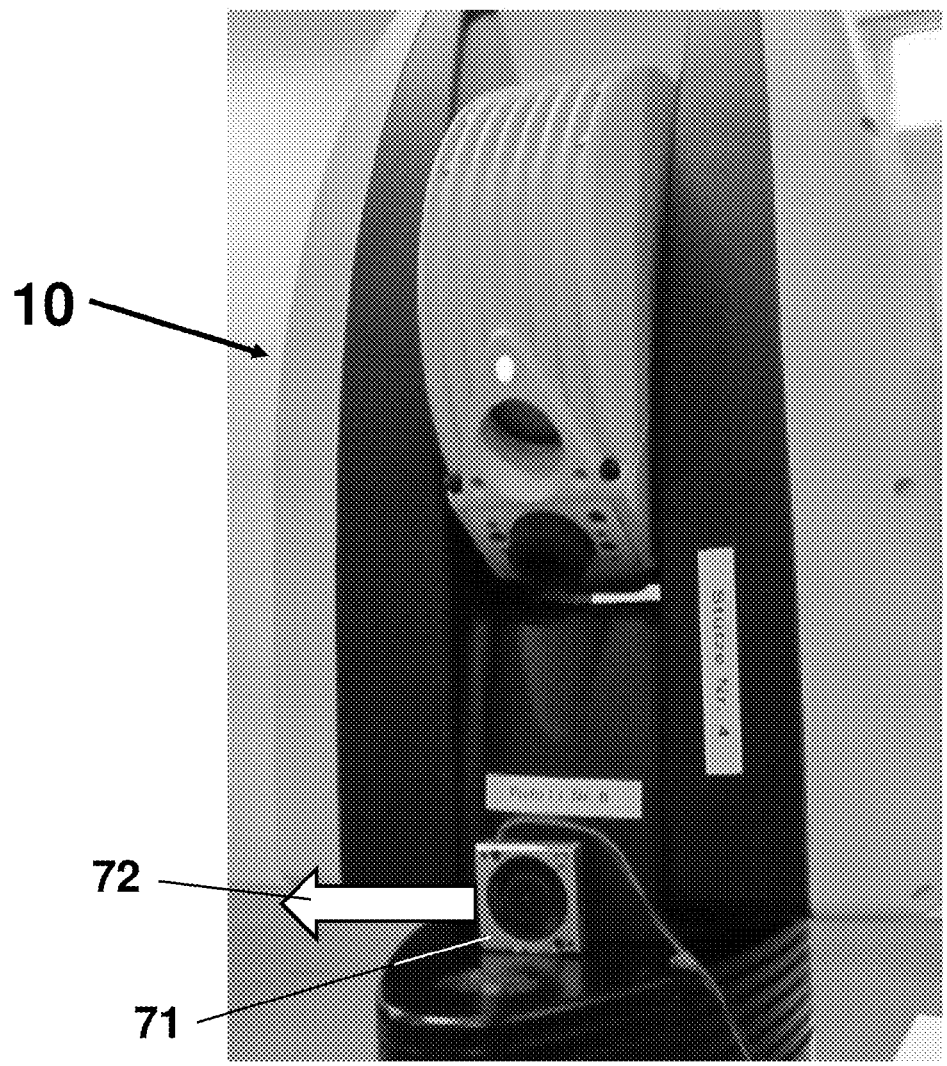
FIG. 15: shows a fan or ventilator, which is arranged and operated on a stand or a base of the laser tracker according to the invention, as an example of a further embodiment of a heat influence reduction component according to the invention.
Figure 16:
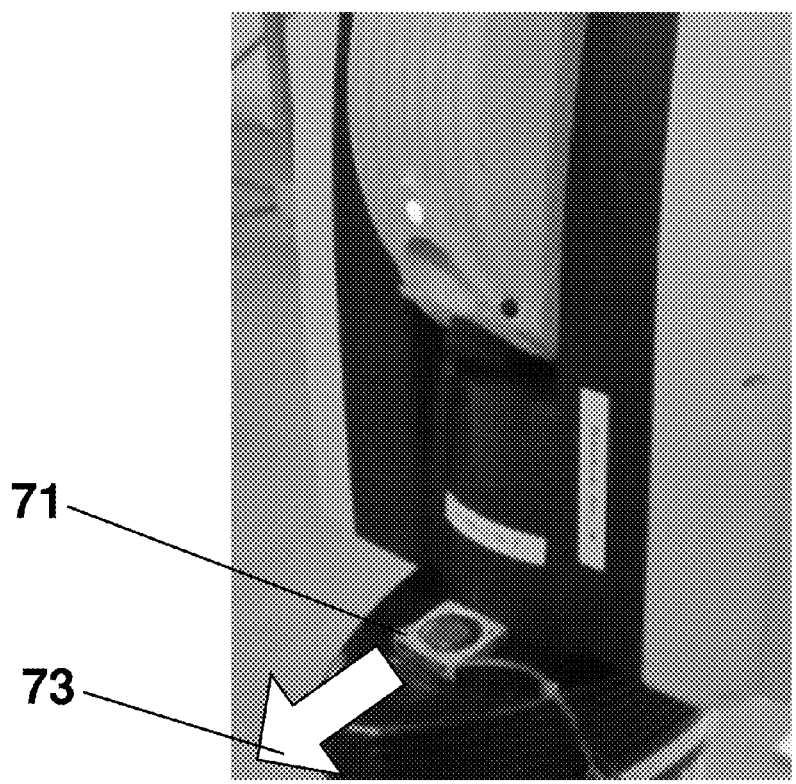
FIG. 16: shows a fan or ventilator, which is arranged and operated on the stand or the base of the laser tracker according to the invention, as an example of a further embodiment of a heat influence reduction component according to the invention in order, as a development of the example in accordance with FIG. 15, to blow in a direction perpendicular thereto.
Figure 17:
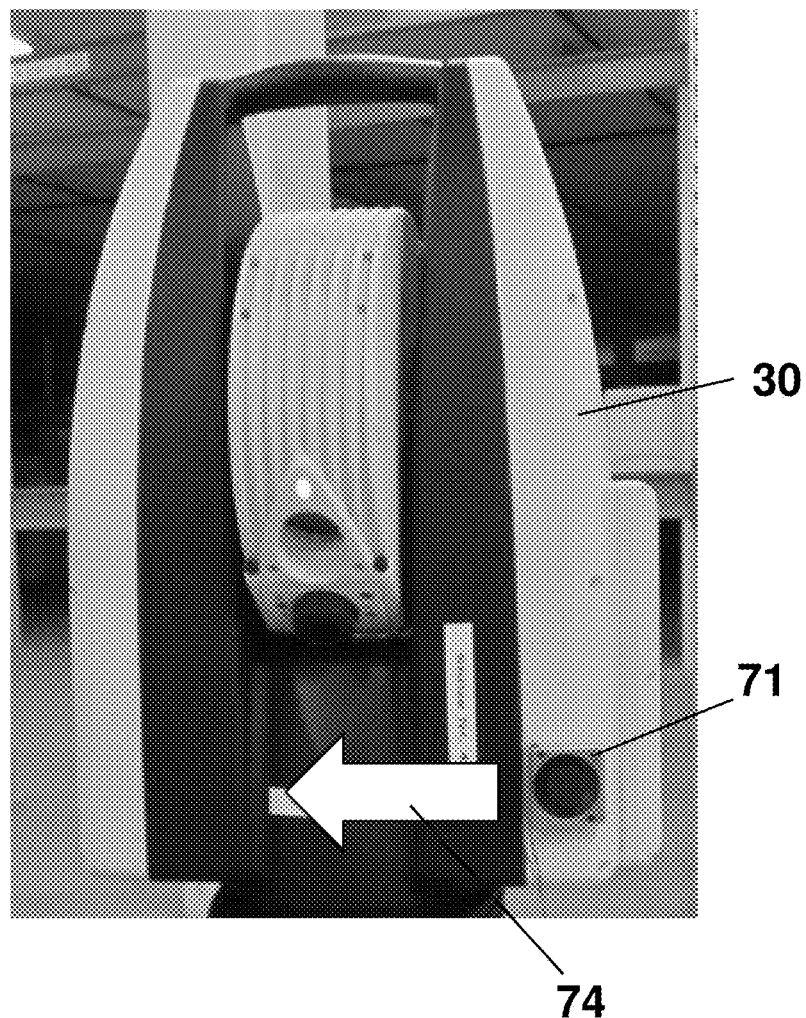
FIG. 17: shows a fan or ventilator, which is arranged and operated in a lower region of a support of the laser tracker according to the invention, as an example of a further embodiment of a heat influence reduction component according to the invention in order to suction in surrounding air which was not heated as a result of the operation and blow this away in an air flow away from a near region beam path of the laser tracker.

FIGS. 15 to 17 show embodiments—once again having different embodiments in relation to the functional principle than those corresponding to the preceding examples—of a heat influence reduction component according to the invention for a coordinate measuring machine 10 according to the invention, which is, in particular, embodied as a laser tracker 10.

Here, as an example of such a further embodiment 71, 72 of a heat influence reduction component according to the invention, FIG. 15 shows a fan or ventilator 71, which is arranged and operated on the stand or the base of the laser tracker 13 according to the invention in order, in a plane parallel to the optical axis of the near region beam path of the reception optics of the laser tracker 10 (see FIG. 9), to suction away exhaust heat, in particular from the stand part, in this plane and at a significant distance from said optical axis and to blow it laterally into an air flow 72 such that this exhaust heat does not exert an influence on the near region beam path.

In a development of the exemplary embodiment in accordance with FIG. 15, FIG. 16 shows, as an example for further embodiment 71, 73 of a heat influence reduction component according to the invention, a fan or ventilator 71, which is arranged and operated on the stand or the base of the laser tracker 10 according to the invention in order, in a plane parallel to the optical axis of the near region beam path of the reception optics of the laser tracker 10 (see FIG. 9), to suction away exhaust heat, in particular from the stand part, in this plane and to blow it into an air flow 73 in a manner perpendicular to the blowing-away direction in accordance with FIG. 15 such that this exhaust heat does not exert an influence on the near region beam path.

In a further development of the examples in accordance with FIG. 15 and FIG. 16, FIG. 17 shows, as an example for further embodiment 71, 74 of a heat influence reduction component according to the invention, a fan or ventilator 71, which is arranged and operated in a lower region of the support 30 of the laser tracker 13 in order, in a plane parallel to the optical axis 46 of the near region beam path of the reception optics of the laser tracker (see FIG. 9), to suction in surrounding air as a result of the operation and to blow said air into an air flow 74 in order to obstruct exhaust heat rising from the region of the base from entering the near region beam path of the instrument, in particular to prevent such rising.

It is understood that the figures shown and explained above only schematically depict possible exemplary embodiments. In particular, reference is made to the fact that the explicitly depicted and explained examples are, without exception, usable both separately from one another and in any combination with one another as a heat influence reduction component, in particular for a coordinate measuring machine according to the invention or a laser tracker according to the invention and that they are also combinable with corresponding devices and methods from the prior art.

What is claimed is:

1. A coordinate measuring machine for determining the position of a target embodied as a retroreflector or at least having a retroreflector, the coordinate measuring machine comprising:
    a base defining a vertical axis;
    a beam guiding unit for emitting measurement radiation from a measurement radiation emergence aperture and for receiving at least some of the measurement radiation reflected at the target; wherein
        the beam guiding unit is swivelable about the vertical axis and an inclination axis relative to the base, and
        a measurement axis is defined by an emission direction of the measurement radiation;
    a distance measurement unit for measuring the distance to the target by means of the measurement radiation;
    an angle measurement functionality for determining an alignment of the beam guiding unit relative to the base;
    a target acquisition unit for determining an impact point of radiation reflected by the retroreflector on a sensor of the target acquisition unit and for producing an output signal for controlling a fine targeting functionality; and
    a heat influence reduction component which is embodied and arranged on the coordinate measuring machine in such a way that, as a result thereof,
        heat emission influencing the near region free beam path of the emitted measurement radiation situated in the near region of the coordinate measuring machine and caused by heating of internal components of the coordinate measuring machine, and/or
        warm air, which is produced by such heat emission, is obstructed or prevented from passing through the near region free beam path during the heat-induced rise thereof, wherein:
    the heat influence reduction component comprises an insulation layer situated between the full shield or partial shield and the housing component, which insulation layer is specifically embodied as an air cushion, wherein openings for the measurement radiation emergence aperture, camera optics and/or illumination means are provided in the full shield or partial shield.

2. The coordinate measuring machine according to claim 1, wherein the beam guiding unit is swivelable in a motor-driven manner.

3. The coordinate measuring machine according to claim 1, wherein the heat emission influencing the near region free beam path of the emitted measurement radiation situated in the near region of the coordinate measuring machine is caused by heat emission directly at housing components of the coordinate measuring machine.

4. The coordinate measuring machine according to claim 1, wherein:
    a support which is swivelable about the vertical axis relative to the base and defines the inclination axis, and in that
    the beam guiding unit is embodied as a targeting unit with a telescope unit, which is swivelable in a motor-driven manner about the inclination axis relative to the support and embodied to emit the measurement radiation and receive at least some of the measurement radiation reflected at the target.

5. The coordinate measuring machine according to claim 1, wherein:
    the heat influence reduction component surrounds at least part of the near region free beam path downstream of the measurement radiation emergence aperture and/or it is embodied adjacent to the measurement radiation emergence aperture.

6. The coordinate measuring machine according to claim 1, wherein:
    the heat influence reduction component comprises a heat-shielding material with low thermal conductivity.

7. The coordinate measuring machine according to claim 1, wherein:
    the heat influence reduction component comprises a polymer.

8. The coordinate measuring machine according to claim 1, wherein:
    the heat influence reduction component is embodied as a full shield or as a partial shield, which at least in part additionally covers heat emitting regions from a housing component of the coordinate measuring machine.

9. The coordinate measuring machine according to claim 1, wherein:
    comprises an air emergence nozzle, which has a ring-shaped embodiment and surrounds the measurement radiation emergence aperture, for producing an air cushion, which surrounds the near region beam path and has a lateral side of a frustum-shaped embodiment.

10. The coordinate measuring machine according to claim 1, wherein:
    the heat influence reduction component has a fan or ventilator, arranged at the base or the support of the coordinate measuring machine, for suctioning away heated air and preventing the rise thereof in a region of the near region beam path by blowing away the suctioned in air in a transversely directed air flow or for blowing in non-heated external air in a region below the near region beam path of the measurement radiation emergence aperture for preventing the rising thereof into a region of the near region beam path.

11. A coordinate measuring machine for determining the position of a target embodied as a retroreflector or at least having a retroreflector, the coordinate measuring machine comprising:
    a base defining a vertical axis;
    a beam guiding unit for emitting measurement radiation from a measurement radiation emergence aperture and for receiving at least some of the measurement radiation reflected at the target wherein
        the beam guiding unit is swivelable about the vertical axis and an inclination axis relative to the base, and
        a measurement axis is defined by an emission direction of the measurement radiation;
    a distance measurement unit for measuring the distance to the target by means of the measurement radiation;

an angle measurement functionality for determining an alignment of the beam guiding unit relative to the base;

a target acquisition unit for determining an impact point of radiation reflected by the retroreflector on a sensor of the target acquisition unit and for producing an output signal for controlling a fine targeting functionality; and a heat influence reduction component which is embodied and arranged on the coordinate measuring machine in such a way that, as a result thereof, heat emission influencing the near region free beam path of the emitted measurement radiation situated in the near region of the coordinate measuring machine and caused by heating of internal components of the coordinate measuring machine, and/or warm air, which is produced by such heat emission, is obstructed or prevented from passing through the near region free beam path during the heat-induced rise thereof, wherein:

the heat influence reduction component is embodied and arranged as a pipe-shaped body with a substantially airtight pipe wall in such a way that said body surrounds at least part of the near region free beam path such that, as a result thereof, air streams are prevented from passing through the part of the near region beam path covered by the body and therefore there is a reduction in turbulence in the near region free beam path, which is caused e.g. by rising warm air.

12. The coordinate measuring machine according to claim 11, wherein:

the pipe-shaped body has a hollow or internal cross-sectional dimension which corresponds to a dimension of the measurement radiation emergence aperture, wherein the internal cross-sectional dimension of the pipe-shaped body only slightly exceeds the dimension of the measurement radiation emergence aperture.

13. The coordinate measuring machine according to claim 11, wherein:

with the ends thereof, the pipe-shaped body is arranged directly at part of the housing surrounding the measurement radiation emergence aperture.

14. The coordinate measuring machine according to claim 11, wherein:

the pipe-shaped body has a cross-sectional shape which corresponds to the shape of the measurement radiation emergence aperture.

15. The coordinate measuring machine according to claim 11, wherein:

the pipe-shaped body has a round, oval, elliptic or polygonal cross-section.

16. The coordinate measuring machine according to claim 11, wherein:

the pipe-shaped body has a length of at least 2 cm.

17. The coordinate measuring machine according to claim 11, wherein:

an internal wall surface of the pipe-shaped body has a non-reflecting configuration, wherein the internal wall surface is configured is dark, unpolished polymer surface.

* * * * *